United States Patent
Xu

(10) Patent No.: US 11,010,113 B2
(45) Date of Patent: May 18, 2021

(54) METHOD AND APPARATUS FOR PRINTING RELATIONAL GRAPH

(71) Applicant: ALIBABA GROUP HOLDING LIMITED, Grand Cayman (KY)

(72) Inventor: Lingzhi Xu, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/803,873

(22) Filed: Feb. 27, 2020

(65) Prior Publication Data

US 2020/0201584 A1 Jun. 25, 2020

Related U.S. Application Data

(63) Continuation of application No. PCT/CN2018/102675, filed on Aug. 28, 2018.

(30) Foreign Application Priority Data

Sep. 4, 2017 (CN) .......................... 201710783750.4

(51) Int. Cl.
*G06F 3/12* (2006.01)

(52) U.S. Cl.
CPC ............ *G06F 3/125* (2013.01); *G06F 3/1208* (2013.01); *G06F 3/1241* (2013.01)

(58) Field of Classification Search
CPC ....... G06F 3/125; G06F 3/1208; G06F 3/1241
USPC .................................................. 358/1.1–1.18
See application file for complete search history.

(56) References Cited

U.S. PATENT DOCUMENTS

| | | | | |
|---|---|---|---|---|
| 8,264,739 B2* | 9/2012 | Yamanouchi | ......... | G06F 3/1228 |
| | | | | 358/1.2 |
| 2009/0244582 A1* | 10/2009 | Shestak | ................. | G06F 3/1213 |
| | | | | 358/1.13 |

FOREIGN PATENT DOCUMENTS

| | | |
|---|---|---|
| CN | 101551737 A | 10/2009 |
| CN | 101646000 A | 2/2010 |
| CN | 102689529 A | 9/2012 |
| CN | 104228369 A | 12/2014 |
| CN | 106447676 A | 2/2017 |
| WO | WO 2019/042276 A1 | 3/2019 |

OTHER PUBLICATIONS

PCT International Search Report dated Dec. 4, 2018, issued in corresponding International Application No. PCT/US2018/102675 (5 pgs.).

* cited by examiner

*Primary Examiner* — Gabriel I Garcia
(74) *Attorney, Agent, or Firm* — Finnegan, Henderson, Farabow, Garrett & Dunner, LLP

(57) ABSTRACT

Provided by the present disclosure are a method and an apparatus for printing a relational graph. The method for printing a relational graph includes: determining whether an overall view of a to-be-printed relational graph exceeds a set print size; in response to the overall view of a to-be-printed relational graph exceeding the set print size, clustering nodes in the to-be-printed relational graph according to the print size and attribute information of the nodes to form a clustered overall view of the relational graph and subviews of the relational graph; and printing the clustered overall view of the relational graph after the clustering and subviews formed based on the clustered nodes. At least one embodiment of the present disclosure can automatically split a relational graph into pages for printing.

20 Claims, 10 Drawing Sheets if an overall view of a to-be-printed relational graph exceeds a set print size, clustering nodes in the to-be-printed relational graph according to attribute information of the nodes, so that an overall view of the relational graph after the clustering is within the range of the print size ⸺S110

Separately printing the overall view of the relational graph after the clustering and subviews formed by the clustered nodes ⸺S120

FIG. 3

METHOD AND APPARATUS FOR PRINTING RELATIONAL GRAPH

The present application claims priority to International Application No. PCT/CN2018/102675, filed on Aug. 28, 2018, which claims priority to Chinese Patent Application No. 201710783750.4, filed on Sep. 4, 2017, all of which are incorporated herein by reference in their entireties.

BACKGROUND

When analyzing a relational network, a view used in the analysis (hereinafter referred to as a relational graph) tends to become very large, containing thousands of nodes and relations; the relational graph (which may be used for intuitively displaying the topology of the relational network) is generally a graph composed of a plurality of nodes and lines connecting the nodes. Each node may correspond to a specific item (such as a user, a device, and a place), and a line between two nodes may represent a relationship between two items.

In the process of printing a relational graph, if the relational network is large and it is required to print the graph on one piece of paper at a ratio of 1:1, the piece of paper often needs to be several meters long and several meters wide. If the printing is scaled down, the details in the relational graph may not be legible. For example, if the relational graph shown in FIG. 1 is printed on a piece of A4 or smaller paper, the characters in the nodes will not be legible, or it will take a lot of effort to see them clearly.

At present, the scheme of paging printing is generally adopted. Paging with equal width or equal height is performed according to a print size on the basis of an actual size. For example, each of the equal-width and equal-height grids shown in FIG. 2 is a page to be printed.

Equal-width or equal-height paging printing can have problems. For example, there will be a lot of blank print areas in the graph area, which causes the waste of paper. The original level and relational structures of the relational network are broken, which is not convenient for single-sheet reading.

SUMMARY

Embodiments of the present disclosure provides a method and an apparatus for printing a relational graph.

In some embodiments, an exemplary method for printing a relational graph includes: determining whether an overall view of a to-be-printed relational graph exceeds a set print size; in response to the overall view of a to-be-printed relational graph exceeding the set print size, clustering nodes in the to-be-printed relational graph according to the print size and attribute information of the nodes to form a clustered overall view of the relational graph and subviews of the relational graph; and printing the clustered overall view of the relational graph after the clustering and subviews formed based on the clustered nodes.

In some embodiments, an exemplary apparatus for printing a relational graph includes a memory storing a set of instructions and at least one processor. The processor can be configured to execute the set of instructions to cause the apparatus to perform: determining whether an overall view of a to-be-printed relational graph exceeds a set print size; in response to the overall view of a to-be-printed relational graph exceeding the set print size, clustering nodes in the to-be-printed relational graph according to the print size and attribute information of the nodes to form a clustered overall view of the relational graph and subviews of the relational graph; and printing the clustered overall view of the relational graph after the clustering and subviews formed based on the clustered nodes.

In some embodiments, an exemplary non-transitory computer readable storage medium storing a set of instructions that are executable by one or more processing devices to cause a computer to perform a method for printing a relational graph. The method includes: determining whether an overall view of a to-be-printed relational graph exceeds a set print size; in response to the overall view of a to-be-printed relational graph exceeding the set print size, clustering nodes in the to-be-printed relational graph according to the print size and attribute information of the nodes to form a clustered overall view of the relational graph and subviews of the relational graph; and printing the clustered overall view of the relational graph after the clustering and subviews formed based on the clustered nodes.

In at least some embodiments of the present disclosure, in the process of printing a relational graph, nodes in the relational graph can be automatically clustered according to the size of printing paper, thereby splitting and printing the relational graph; the layering of the printing can be ensured and the details of the relational graph can be seen clearly.

BRIEF DESCRIPTION OF THE DRAWINGS

Various other advantages and benefits will become apparent to those skilled in the art from the following detailed description of exemplary embodiments. The drawings are only for the purpose of illustrating the exemplary embodiments and should not be construed as limiting the present disclosure. Throughout the drawings, the same reference numerals are used to represent the same parts. In the figures:

FIG. 3 is a flowchart of an exemplary method for printing a relational graph according to some embodiments of the present disclosure.

DETAILED DESCRIPTION

Figure 1:
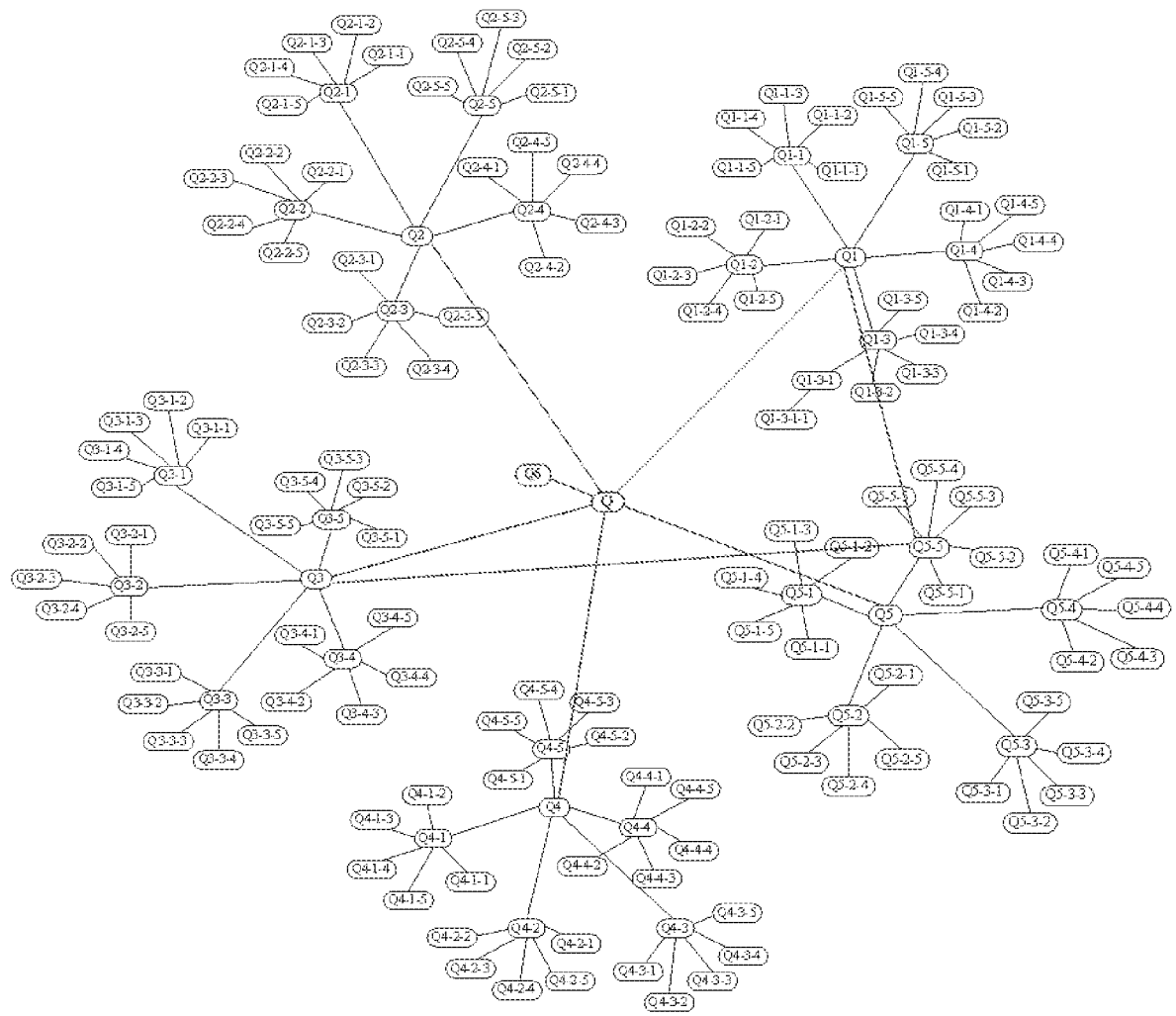
FIG. 1 shows a relational graph used as an example where details cannot be clearly displayed when printed.
Figure 2:
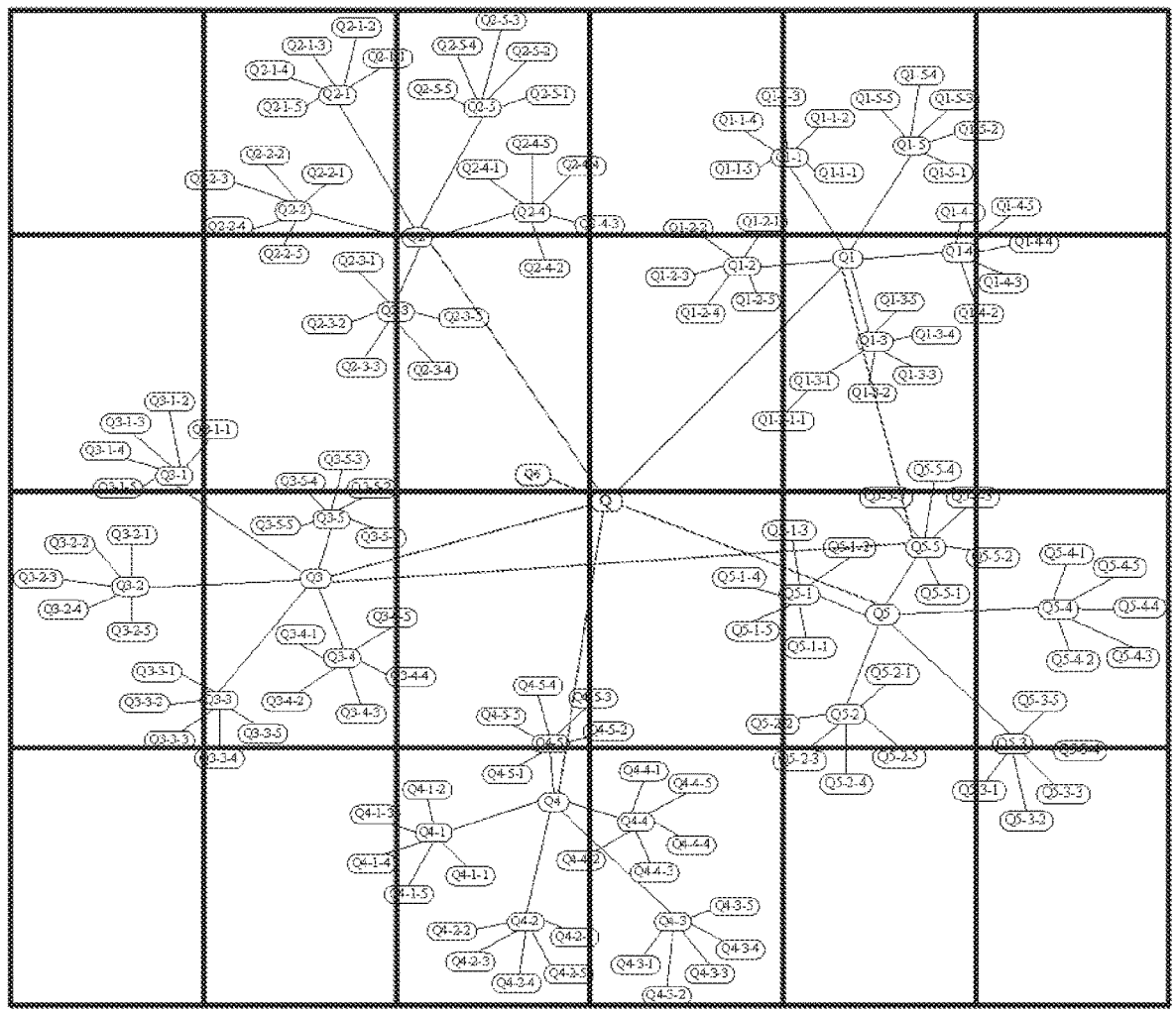
FIG. 2 is a schematic view showing the relational graph of FIG. 1 in the case of paging printing.

The technical solution of the present disclosure will be described in detail with reference to embodiments and the accompanying drawings.

It should be noted that, if not conflicting, the embodiments of this disclosure and various features in the embodiments can be combined with each other, which are all within the scope of this disclosure. In addition, although a logical order is shown in the flow chart, in some embodiments, the steps shown or described can be performed in an order different from that herein.

In a configuration, a computing device for relational graph printing can include one or more processors (e.g., CPUs), input/output interfaces, network interfaces, and a memory. The memory can be any computer-readable medium, including, but not limited to a non-permanent memory, such as a random access memory (RAM), and/or a nonvolatile memory, such as a read-only memory (ROM) or a flash RAM. The memory is an example of computer-readable media. The memory can include one or more modules. Computer readable media include both permanent and non-permanent, removable and non-removable storage media and can store information by any method or technology. The information can be a computer readable instruction, a data structure, a module of a program or other data. Examples of computer storage media include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a tape cassette, a magnetic disk storage or other magnetic storage devices or any other non-transmission medium, and can be used for storing information accessible by computing devices.

FIG. 3 is a flowchart of an exemplary method for printing a relational graph according to some embodiments of the present disclosure. The method for printing a relational graph can include, as shown in FIG. 3, step S110 and step S120. At step S110, if an overall view of a to-be-printed relational graph exceeds a set print size, nodes in the to-be-printed relational graph are clustered according to attribute information of the nodes, so that an overall view of the relational graph after the clustering is within the range of the print size. At step S120, the overall view of the relational graph after the clustering and subviews formed by the clustered nodes are separately printed.

In some embodiments, in the process of printing the relational graph, the nodes in the relational graph can be automatically clustered according to the size of printing paper, thereby splitting and printing the relational graph. The hierarchy of the printing can be ensured and the details of the relational graph can be seen clearly.

In some embodiments, the method can be, but is not limited to being, applied to a big data product. Since the relational graph of big data is often complicated and relatively large, it is often impossible to print the relational graph on one piece of paper. By adopting the method of some embodiments, the relational graph can be automatically printed hierarchically to meet the needs of the user.

In some embodiments, multiple views can be obtained according to the hierarchical structure of the relational network itself. In addition to the overall view, other views can be sub-views formed by each cluster of nodes after re-clustering. Therefore, there can avoid a case where most of the area on the page is blank.

The steps of some embodiments can be performed by an electronic device. The electronic device can be a physical machine or a virtual machine, can be a stand-alone single device or distributed devices, or can be a user's personal device, or a remote server.

In some embodiments, the attribute information of each node in the relational graph can be acquired from a device for generating or collecting data of the relational network or can be manually entered and saved in a device performing the above steps S110 to S120.

In some embodiments, the attribute information of a node can include one or more of: coordinates of the node, an attribute value of the node, relationships between the node and other nodes, and the like. The relationships between the node and other nodes can be reflected in the view as lines between the nodes.

The node can have one or more attribute values, such as the level and content of the node. For example, the relational graph of FIG. 1 (see FIG. 6 to FIG. 10 for details of each part in FIG. 1) is used to represent a relational network of a company structure. The attribute value of the center node Q of the relational graph can refer to a parent company. The attribute values of Q1-Q6 connected to node Q can refer to different subsidiaries respectively. The attribute values of Qi-1 to Qi-5 (i=1, 2, 3, 4, 5) can refer to divisions in a subsidiary corresponding to the node Qi respectively. The attribute values of Qi-j-1 to Qi-j-5 (j=1, 2, 3, 4, 5) can refer to job numbers of members of a division Qj in the subsidiary corresponding to the node Qi.

In some embodiments, the print size can be a default, preset, or user-entered size, or can be a size selected by the user in a batch of default sizes. For example, the print size can be the size of a certain model of paper selected by the user, such as A4.

In some embodiments, if the overall view of the relational graph exceeds the print size, the user can be prompted whether to perform automatic splitting. If the user selects automatic splitting, clustering and step S120 are performed. Or the user can select manual splitting, for example, the user selects to place which nodes in the relational graph into one cluster.

In some embodiments, the size of the minimum bounding rectangle of each node in the relational graph can be compared with the print size to determine whether the overall view of the relational graph exceeds the print size. If one of the length and width of the minimum bounding rectangle exceeds the print size, it can be determined that the overall view of the relational graph exceeds the print size.

In some embodiments, the user can select a clustering algorithm, such as K-means, hierarchical clustering, Self-organizing Maps (SOM) and variations thereof. In some embodiments, the clustering algorithm used can be determined according to the type of the relational network or the attribute values of nodes.

In some embodiments, the purpose of the clustering is to distinguish which nodes in the relational graph are more similar, or visually, these nodes in the view are "concentrated together". For convenience, these nodes are placed in one subview as a cluster.

In some embodiments, the parameters required for the clustering can be set according to the needs. For example, the clustering can be performed according to the attribute values of the nodes, or according to the coordinates of the nodes, or according to multiple attributes of the nodes.

In some embodiments, the clustering can be performed by splitting one or more clusters of nodes from a batch of nodes.

In some embodiments, the subview formed by any cluster of nodes can be used to reflect the relationships between the nodes of this cluster. For example, the relationships between the nodes can be reflected by the distribution positions of the nodes of this cluster and the lines between the nodes. In some embodiments, the subviews formed by the clustered nodes can be processed as independent views juxtaposed with the overall view. The subviews formed by the clustered nodes can be regarded as hierarchical subgraphs split from the overall view. For example, if the print size is the size of A4 paper, at step S120, the overall view of the relational graph after the clustering and subviews formed by the clustered nodes can be respectively printed on multiple pieces of A4 paper.

In some embodiments, the overall view of the relational graph after the clustering and the subviews formed by the clustered nodes can be printed in an order set by the user, or can be printed sequentially in a print queue, or can be placed in predetermined positions to be selected for printing by the user.

In some embodiments, the method can further include in the overall view of the to-be-printed relational graph, respectively scaling down regions corresponding to respective clusters of nodes obtained by the clustering, thus obtaining the overall view of the relational graph after the clustering. Alternatively, the method can further include in the overall view of the to-be-printed relational graph, displaying each cluster of nodes obtained by the clustering as a node, thus obtaining the overall view of the relational graph after the clustering.

Therefore, this is equivalent to updating the overall view of the to-be-printed relational graph (e.g., the original overall view), and the region corresponding to each cluster of nodes in the original overall view (the region corresponding to a cluster of nodes, e.g., a part of the overall view including this cluster of nodes) is scaled down, or replaced by a node, to obtain the overall view of the relational graph after the clustering.

In addition, each cluster of nodes obtained by clustering is displayed as a node (e.g., a new node is used to replace a cluster of nodes). For example, five clusters of nodes are obtained by clustering, the regions corresponding to the five clusters of nodes in the overall view are replace with five new nodes. The region corresponding to one of these clusters of nodes is replaced with a new node, and the attribute value of the new node can be the attribute value common to this cluster of nodes.

In some embodiments, how much the size of the regions corresponding to the respective clusters of nodes is scaled down can be determined according to the print size. For example, how much the current overall view needs to be scaled down can be calculated if the current overall view is required to be smaller than or equal to the print size. Assuming that the current overall view is 60% of the size of the original overall view, if the regions corresponding to respective clusters of nodes are scaled down, they can also be scaled down to 60% of the original size.

In some embodiments, scaling down regions corresponding to respective clusters of nodes can include generating thumbnails of subviews formed by respective clusters of nodes and replacing the regions corresponding to the respective clusters of nodes in the overall view of the to-be-printed relational graph with the thumbnails of the subviews formed by the respective clusters of nodes, respectively.

Therefore, in the overall view of the relational graph after the clustering, regions corresponding to respective clusters of nodes are scaled down. But details of independent nodes and relationships (e.g., lines) between clusters of nodes and between clusters of nodes and independent nodes can be seen. Details of a cluster of nodes, such as the ID of each node in this cluster and relationships between the nodes in this cluster, can be seen in the subview formed by this cluster of nodes.

Independent node can refer to a node that does not belong to any cluster after clustering. In the overall view, independent nodes cannot be changed.

How much the thumbnails are scaled down can also be determined according to the print size. In some embodiments, the original overall view can be scaled down according to the print size, and then independent nodes therein can be scaled up. In some embodiments, regions corresponding to respective clusters of nodes can be scaled down or replaced in other manners, so that an overall view of the relational graph after the clustering is within the range of the print size.

In some embodiments, printing subviews formed by the clustered nodes can include if a subview formed by a cluster of nodes is within the range of the print size, printing the subview formed by this cluster of nodes. If the subview formed by this cluster of nodes exceeds the print size, this cluster of nodes can be re-clustered according to attribute information of this cluster of nodes to obtain clusters of next-level nodes, so that a subview formed by this cluster of nodes after the re-clustering is within the range of the print size. The subview formed by this cluster of nodes after the re-clustering can be printed.

In some embodiments, the clusters of nodes obtained by clustering or re-clustering include one or more of clusters of nodes obtained by clustering nodes in the to-be-printed relational graph and clusters of next-level nodes obtained by re-clustering a cluster of nodes.

In some embodiments, printing subviews formed by the clustered nodes can be implemented by Steps 21-24. At Step 21, subviews formed by respective clusters of nodes obtained by clustering nodes in the to-be-printed relational graph can be placed in a print queue. At Step 22, if there is a subview in the print queue, a subview formed by a cluster of nodes in the print queue can be taken out and Step 23 can be implemented. At Step 22, if the print queue is empty, the printing process ends. At Step 23, the subview formed by this cluster of nodes can be printed if the subview is within the range of the print size, and the printing process can return to Step 22. At Step 23, Step 24 is implemented if the subview formed by this cluster of nodes exceeds the print size. At Step 24, this cluster of nodes according to attribute information of this cluster of nodes can be re-clustered to obtain clusters of next-level nodes, and subviews formed by the respective nodes of next-level nodes can be placed in the above print queue. The printing process can return to Step 22.

In some embodiments, this is equivalent to splitting the relational graph layer by hierarchy. The hierarchical structure of the relational network itself can be well retained, and the definition of each part in the relational network can be ensured. The paging arrangement is in accordance with the progressive reading habit of the relational network.

In some embodiments, the size of the minimum bounding rectangle of a cluster of nodes in the relational graph can be compared with the print size to determine whether the subview formed by this cluster of nodes exceeds the print size. If one of the length and width of the minimum bounding rectangle of this cluster of nodes exceeds the print size, it can be determined that the subview formed by this cluster of nodes exceeds the print size.

In some embodiments, for example, it is assumed that the relational network itself includes 1000 nodes. At step S110, the nodes in the to-be-printed relational graph are clustered into five clusters, where the cluster X includes 500 nodes, and a subview formed by the nodes in the cluster X exceeds the print size. In this case, the nodes in the cluster X can be re-clustered, for example, into 8 clusters: X-1 to X-8. The nodes in the clusters X-1 to X-8 are next-level nodes of the cluster X. Assuming that a subview formed by cluster X-2 including 50 nodes still exceeds the print size, the nodes in the cluster X-2 can be re-clustered. Similar process can be performed in similar cases until none of subviews formed by respective clusters of nodes (including clusters of nodes obtained by clustering the to-be-printed relational graph and clusters of nodes obtained by clustering at Step 24) exceeds the print size.

In some embodiments, if none of the subviews formed by respective clusters of nodes obtained by clustering the to-be-printed relational graph in Step S110 exceeds the print size, the clustering can be not performed, and the subviews formed by respective clusters of nodes are directly printed.

In some embodiments, the method can further include in the subview formed by this cluster of nodes, respectively scaling down regions corresponding to respective clusters of next-level nodes obtained by the clustering, thus obtaining a subview formed by this cluster of nodes after the re-clustering. Alternatively, the method can further include in the subview formed by this cluster of nodes, displaying each cluster of next-level nodes obtained by the clustering as a node, thus obtaining the subview of this cluster of nodes after the re-clustering.

The operation of scaling down the regions corresponding to respective clusters of next-level nodes obtained by the re-clustering is equivalent to updating the subviews exceeding the print size. The scaled-down regions corresponding to respective clusters of next-level nodes are used to respectively replace regions originally occupied by these next-level nodes in the subviews exceeding the print size. For example, in the example described above, in the subview formed by the nodes in cluster X, the nodes in the clusters X-1 to X-8 are scaled down, and then are used to respectively replace the regions originally occupied by the nodes in the clusters X-1 to X-8 . For the implementation details of this operation, reference can be made to the case of updating of the overall view.

The amplitude of the scaling down can be determined according to the print size. For example, in the above example, it is assumed that the subview formed by the nodes in the cluster X needs to be scaled down to 80% of the original size to not exceed the print size. In the case of scaling down the regions corresponding to respective clusters of nodes at the next level, they can also be scaled to 80% of the original size.

The scaling-down operation can also be implemented by generating thumbnails of subviews formed by respective clusters of next-level nodes and respectively replacing the regions corresponding to the respective clusters of nodes in the original view with the thumbnails of the respective clusters of nodes at the next level. For example, in the above example, thumbnails of the subviews formed by nodes in clusters X-1 to X-8 can be formed, and then used to respectively replace regions corresponding to the nodes in clusters X-1 to X-8 nodes in the subview formed by the nodes in the cluster X.

In some embodiments, the subview formed by the nodes in cluster X can also be directly scaled down according to the print size.

In some embodiments, the overall view of the relational graph can refer to a maximal connected subgraph including all nodes in the relational graph.

Respective subviews are formed by respective clusters of nodes obtained by clustering. For example, a subview formed by a cluster of nodes is a maximal connected subgraph including this cluster of nodes.

The calculation of the connected subgraphs is a relatively common problem in the graph theory. There are many classic algorithms for solving connected subgraphs in the graph theory, and they all can be used in some embodiments.

The connected subgraphs can effectively split a large graph into relatively independent units which can be considered as a cluster, an organization, or a group with similar relationships and attributes. Placing all units in a view makes it easier to fully retain the information of the relational graph. The graph as shown in FIG. 1 can be regarded as the maximal connected subgraph including all nodes in the relational graph.

In some embodiments, it is ensured that the nodes in each connected subgraph are in one view or one set of views.

Figure 4:
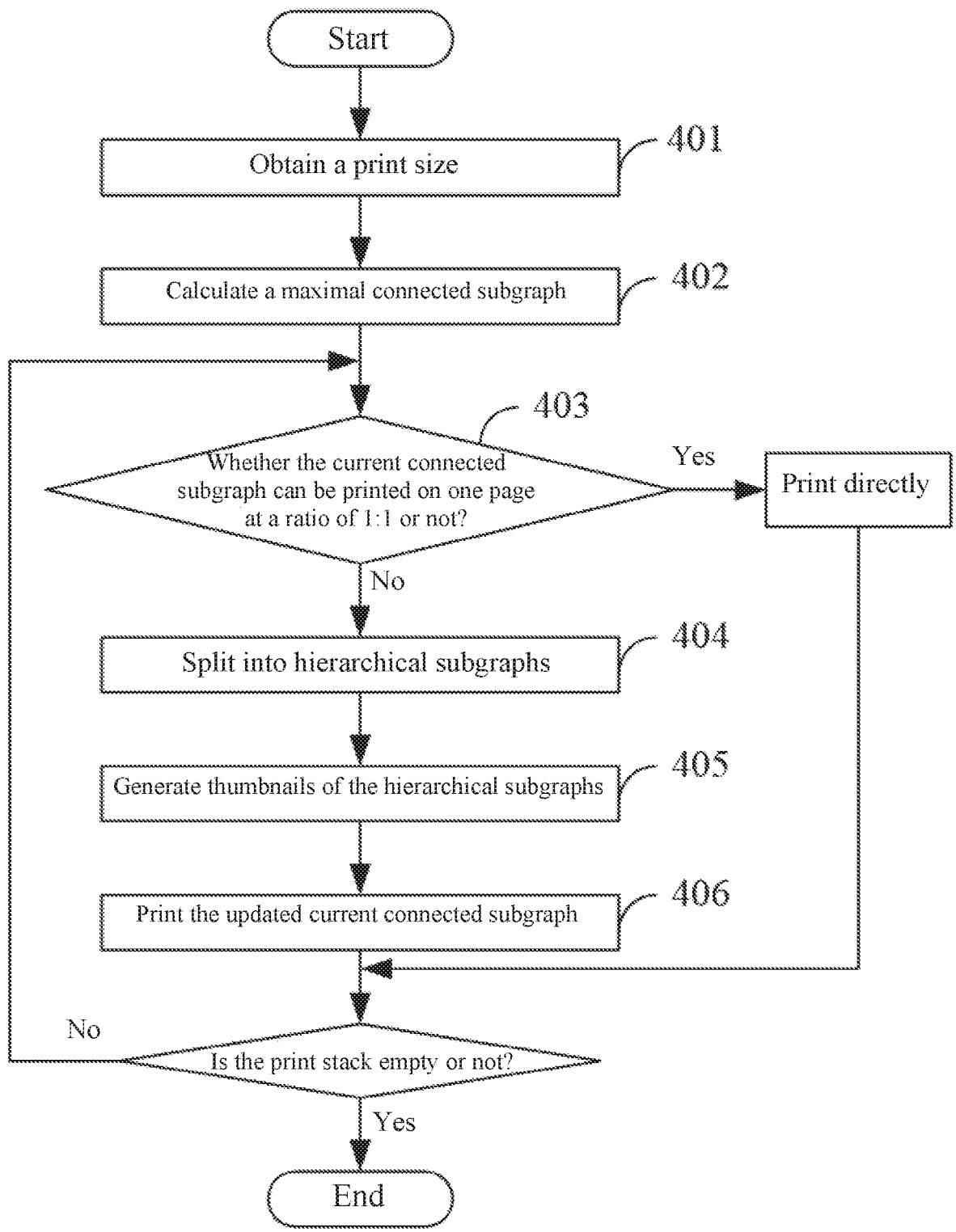
FIG. 4 is a flowchart of an exemplary method for printing a relational graph according to some embodiments of the present disclosure.

Some embodiments will be described as follows by an example. FIG. 1 can be used as a to-be-printed relational graph. The printing process is as shown in FIG. 4, and includes the Steps 401-406. At Step 401, a print size is obtained. For example, the print size can be entered by a user. At Step 402, attribute information of each node in the to-be-printed relational graph is obtained, and a maximal connected subgraph including all nodes in the relational graph, e.g., an overall view of the relational graph, is calculated according to the obtained attribute information. For example, the maximal connected subgraph calculated can be the relational graph shown in FIG. 1.

The attribute information of a node can include the ID, coordinates, and attribute value of the node, and relationships between the node and other nodes. The node can have one or more attribute values. The attribute value can also include the level of the node, and the level can also be reflected in the ID of the node. For example, a node at a higher level has a shorter ID.

The relationships between one node and other nodes can be represented as lines in a figure. The relationships between one node and other nodes can include a hierarchal relationship. For example, the node belongs to which upper-level node and includes which sub-level nodes. For another example, the highest level in FIG. 1 is node Q, which includes 6 sub-level nodes Q1-Q6. Node Qi (i=1, 2, 3, 4, 5) includes 5 sub-level nodes Qi-1 to Qi-5. Qi-j (j=1, 2, 3, 4, 5) includes 5 sub-level nodes Qi-j-1 to Qi-j-5. The hierarchal relationship can also be reflected by the IDs of the nodes. For example, the ID of a sub-level node includes the ID of an upper-level node to which the sub-level node belongs.

The relationships between one node and other nodes can also include other association relationships, for example, interaction between two nodes of the same level, and for another example, interaction between two nodes of different levels and not in a hierarchal relationship, such as nodes Q1 and Q3 being both connected to Q5-5 in FIG. 1.

Step 403 is performed by using the calculated maximal connected subgraph as the current connected subgraph.

At Step 403, according to the print size, whether the current connected subgraph can be printed according to the original size (e.g., a ratio of 1:1) within one page (can be referred to as 1:1 printing) can be determined. For example, it is determined whether the length and width of the minimum bounding rectangle of each node in the current connected subgraph are less than or equal to the length and width of the print size respectively. If the length and width are both smaller than those of the print size, it is determined that the current connected subgraph can be printed on one page at a ratio of 1:1. If one of the length and width is larger than that of the print size, it is determined that the current connected subgraph cannot be printed on one page at a ratio of 1:1.

If the 1:1 printing is feasible, the current connected subgraph can be directly printed (if there are currently to-be-printed connected subgraphs, the current connected subgraph can be placed in a print stack and wait for printing). After printing, next connected subgraph in the subgraph queue is considered as the current connected subgraph and the process returns to Step 403. Or the process comes to the end if the print stack is empty.

If the 1:1 printing is not feasible, the process proceeds to Step 404. For example, if the connected subgraph shown in FIG. 1 is the current connected subgraph, since the connected subgraph is very large in size and there are many levels and branches, the connected subgraph cannot be printed on one page at a 1:1 ratio. In this case, the connected subgraph needs to be split through node clustering (e.g., Step 404 is performed). In some embodiments, the hierarchical subgraphs obtained after splitting (e.g., the subviews formed by respective clusters of nodes) are printed as thumbnails. This can ensure the completeness of the connected subgraph and realize printing on one page. It will only sacrifice the printing effect of some hierarchical subgraphs, which can be compensated by printing each hierarchical subgraph separately in the subsequent steps.

At Step 404, the current connected subgraph is split and the nodes in the current connected subgraph are divided into multiple clusters through a clustering algorithm. In the current connected subgraph, the maximal connected subgraph of each cluster of nodes (e.g., a subview formed by each cluster of nodes) is determined respectively as a hierarchical subgraph of the current connected subgraph. The hierarchical subgraph is a component of the current connected subgraph. The connected subgraphs of respective clusters of nodes are placed in the print stack. After nodes that have been placed in a certain cluster are removed, one or more independent nodes that do not belong to any cluster can still remain in the current connected subgraph.

Figure 5:
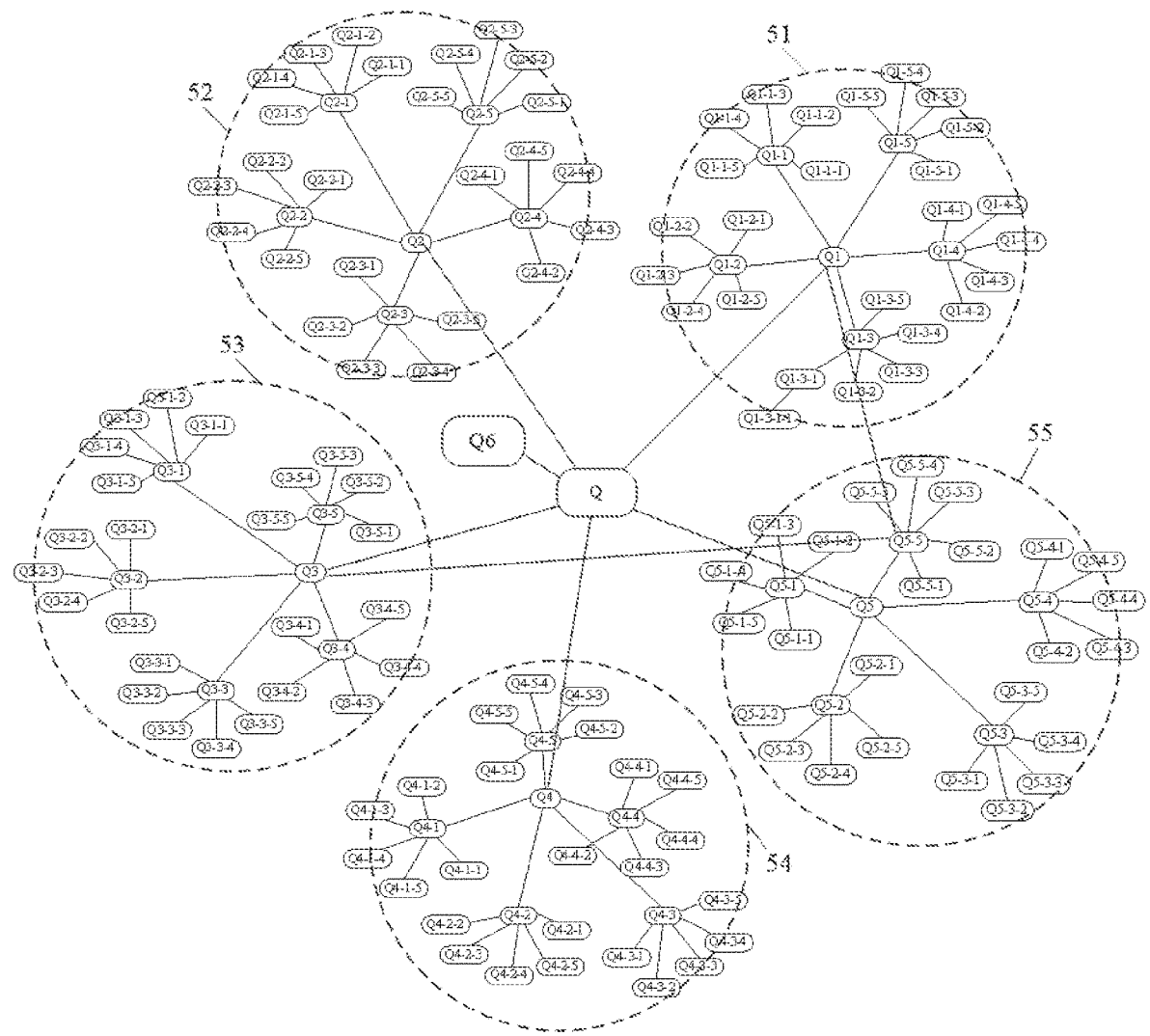
FIG. 5 is a schematic view showing hierarchical subgraphs split according to some embodiments of the present disclosure.
Figure 6:
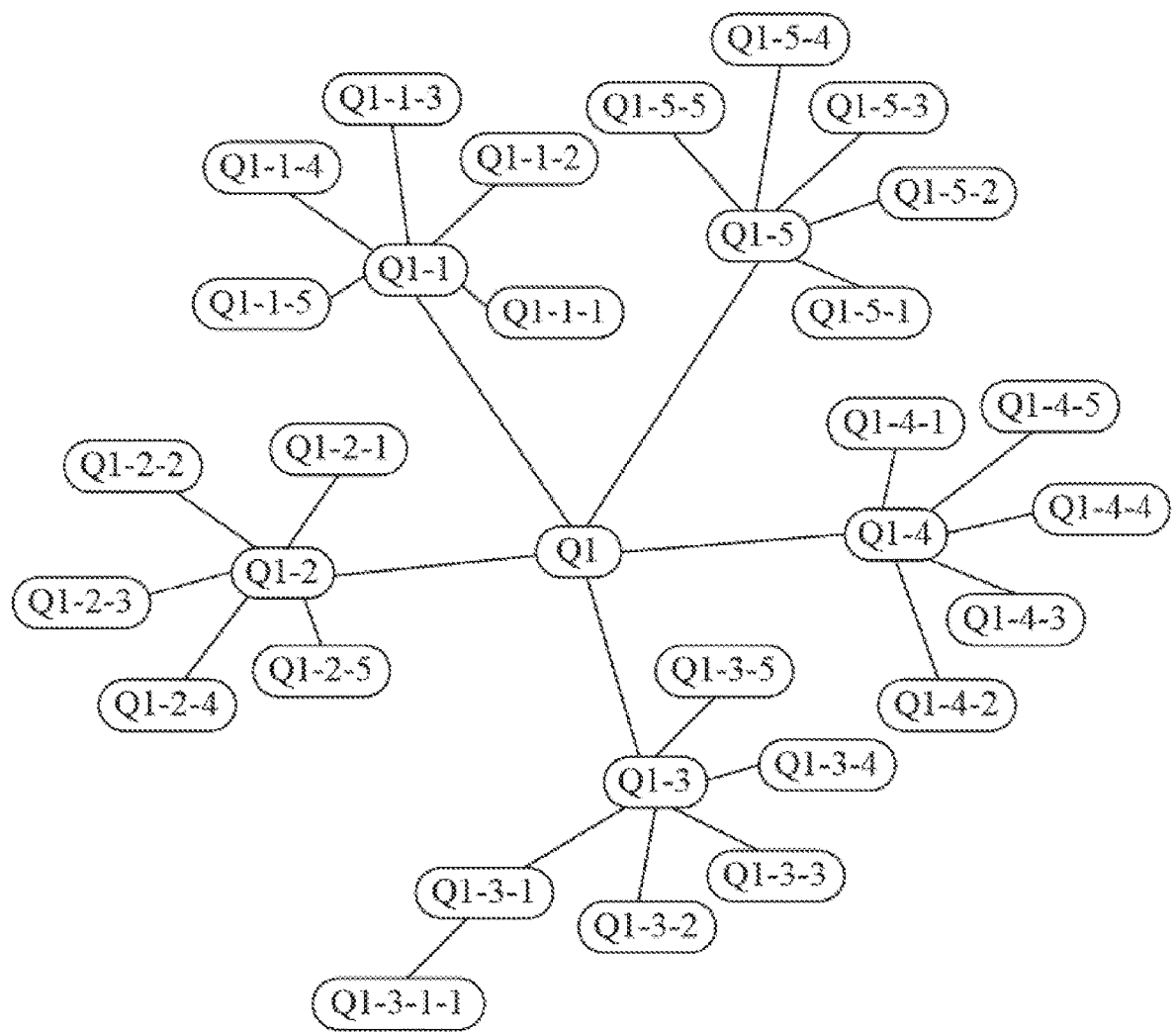
FIG. 6 is a printout effect of a hierarchical subgraph on one page according to some embodiments of the present disclosure.
Figure 7:
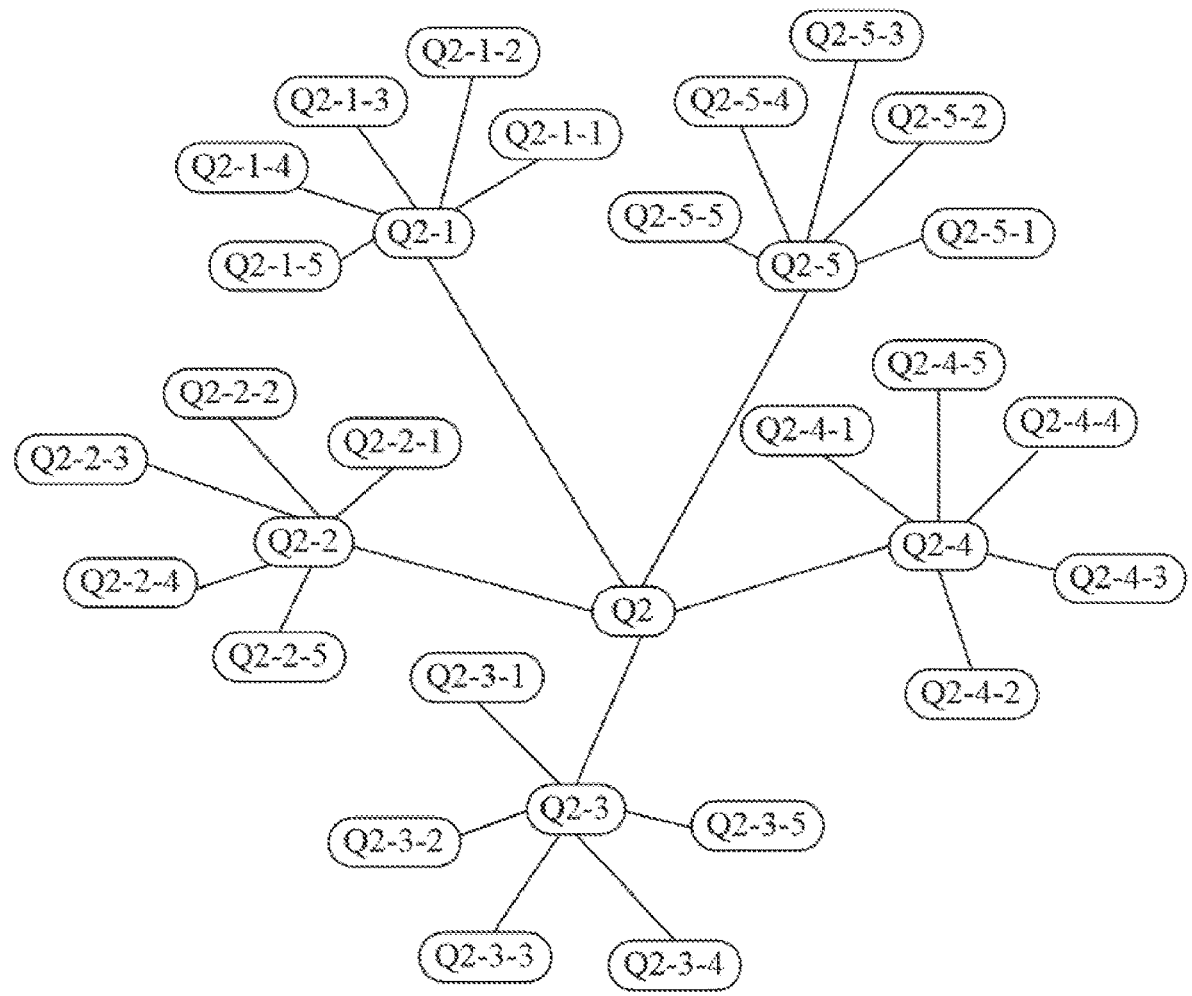
FIG. 7 is a printout effect of a hierarchical subgraph on one page according to some embodiments of the present disclosure.
Figure 8:
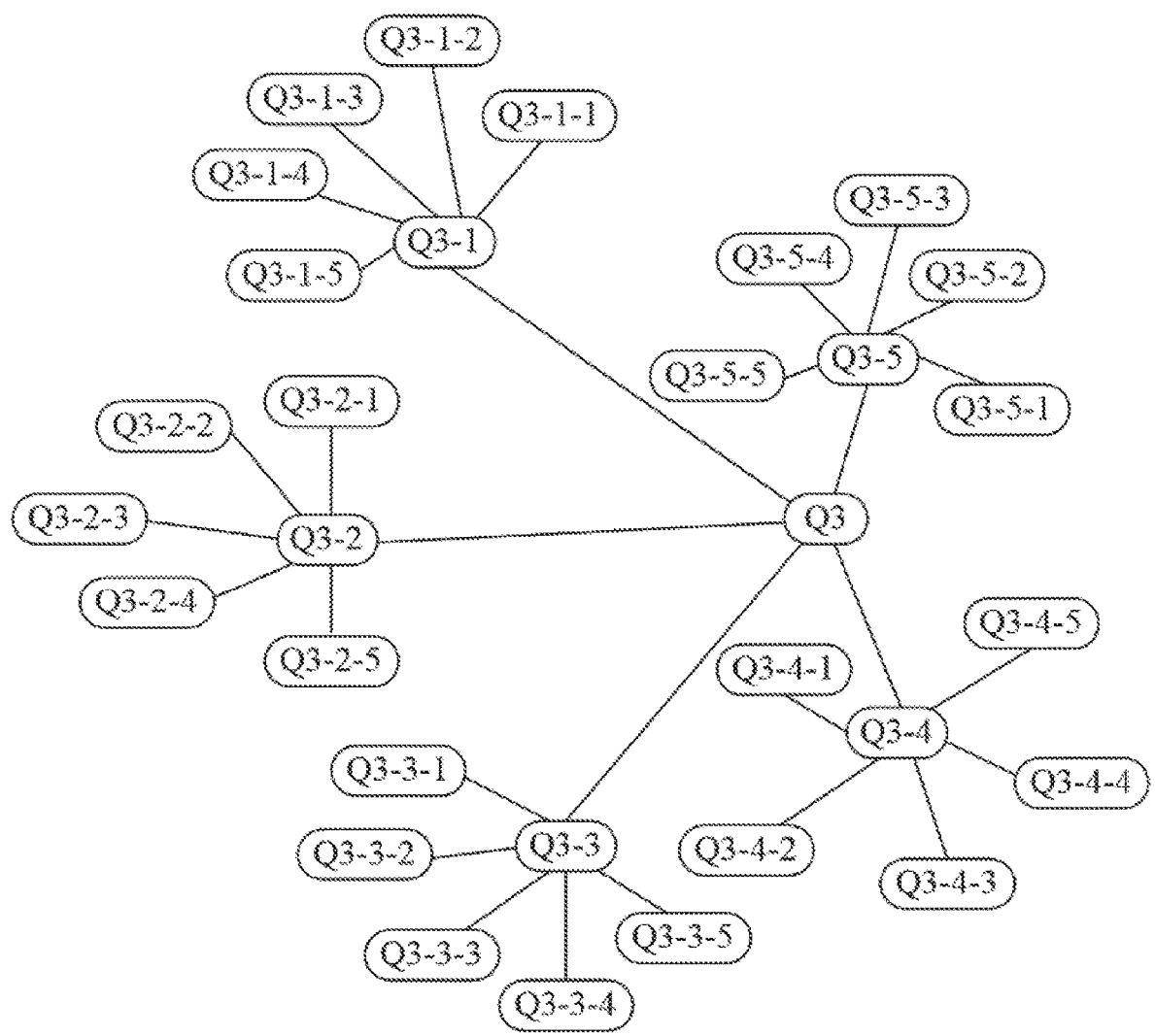
FIG. 8 is a printout effect of a hierarchical subgraph on one page according to some embodiments of the present disclosure.
Figure 9:
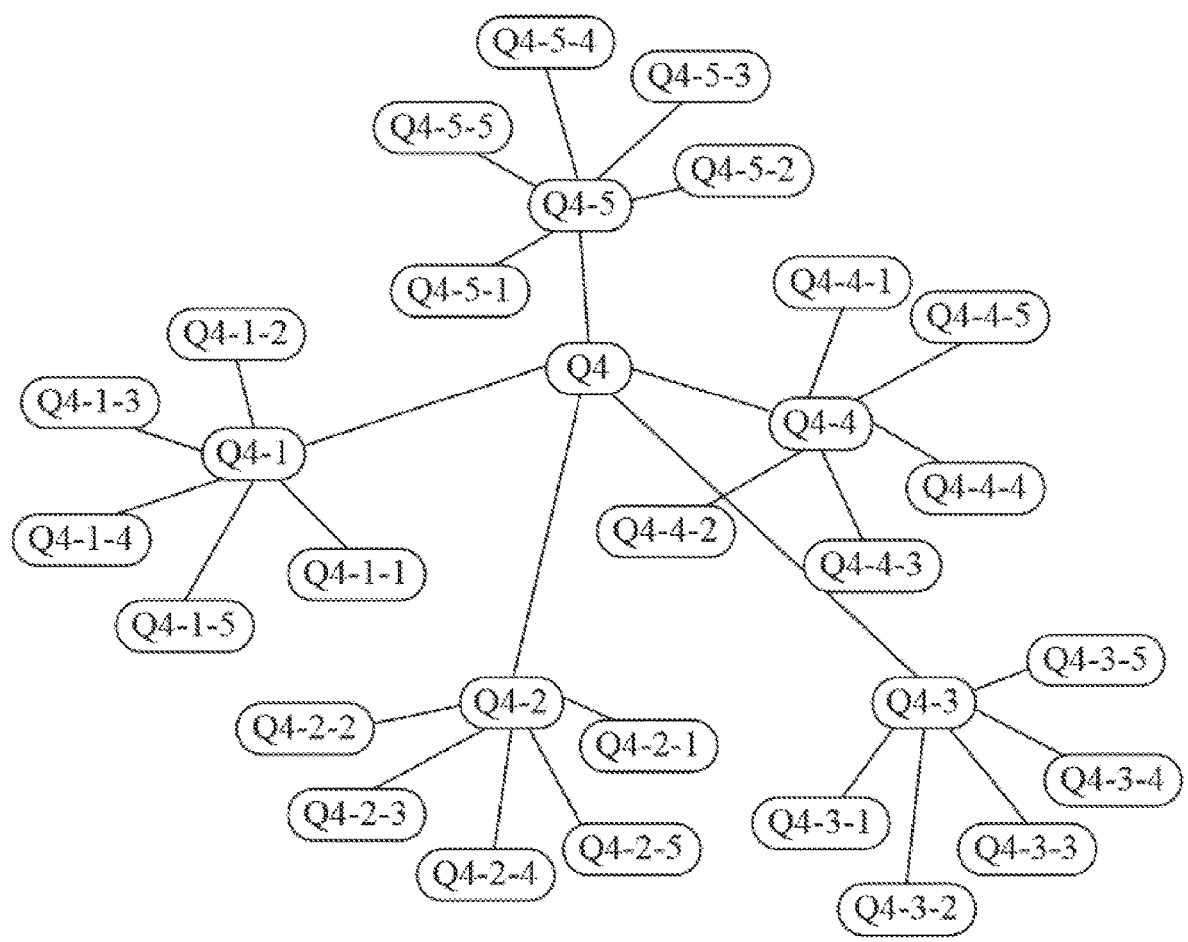
FIG. 9 is a printout effect of a hierarchical subgraph on one page according to some embodiments of the present disclosure.
Figure 10:
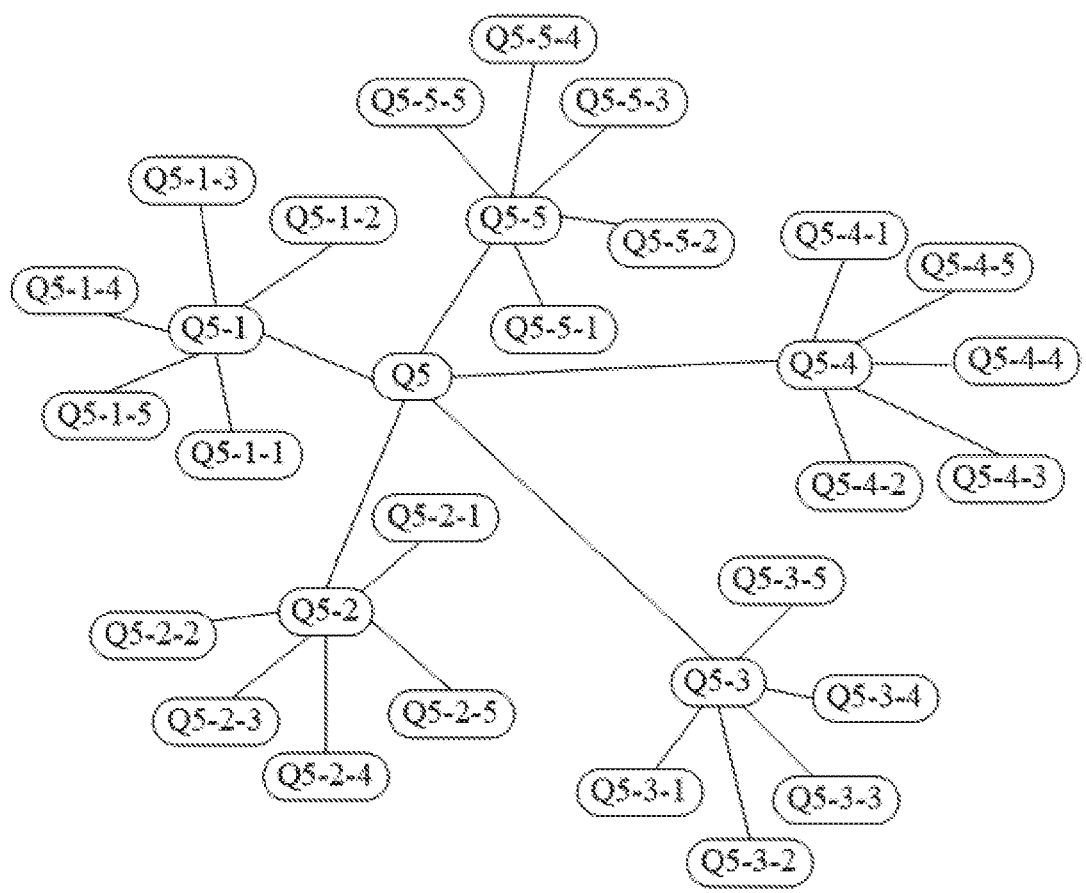
FIG. 10 is a printout effect of a hierarchical subgraph on one page according to some embodiments of the present disclosure.

For example, if the graph shown in FIG. 1 is the current connected subgraph, it is assumed that, after clustering, Q1-$j$-1 to Q1-$j$-5 ($j$=1, 2, 3, 4, 5) are placed in one cluster, Q2-$j$-1 to Q2-$j$-5 are placed in one cluster, Q3-$j$-1 to Q3-$j$-5 are placed in one cluster, Q4-$j$-1 to Q4-$j$-5 are placed in one cluster, and Q5-$j$-1 to Q5-$j$-5 are placed in one cluster. Five hierarchical subgraphs can be split according to the clustering results, such as hierarchical subgraph 51, hierarchical subgraph 52, hierarchical subgraph 53, hierarchical subgraph 54, and hierarchical subgraph 55. As shown in FIG. 5, independent nodes Q and Q6 will remain.

At Step 405, the thumbnails of all hierarchical subgraphs of the current connected subgraph are generated. The current connected subgraph is updated, and regions of the corresponding nodes in the current connected subgraph are replaced with the thumbnails of the hierarchical subgraphs. For example, the region occupied by the nodes in the hierarchical subgraph 51 is replaced with the thumbnail of the hierarchical subgraph 51, and the same operation is performed in other similar cases.

For example, if the current connected subgraph is the graph shown in FIG. 1, the five hierarchical subgraphs are compressed according to a single page ratio to generate thumbnails to ensure that the connected subgraph shown in FIG. 1 can be printed on one page. Therefore, the overall structure of the connected subgraph shown in FIG. 1 can be seen first. FIG. 1 updated with thumbnails is as shown in FIG. 5 (the dotted line circles in FIG. 5 are intended to indicate the ranges of the hierarchical subgraphs and do not exist in the printouts). Although details of the subviews formed by respective clusters of nodes are not visible in FIG. 5, the overall structures between clusters of nodes and between the clusters of nodes and independent nodes can be seen, and the details of independent nodes can be clearly seen.

Because the relationships between the nodes are not changed (the nodes at the two ends of an original line are changed), in the thumbnails of the hierarchical subgraphs, the nodes that are originally connected to other subgraphs or independent nodes can still be connected in the same way. For example, in FIG. 5, nodes Q1-Q5 in the thumbnail of the hierarchical subgraph are still connected to node Q, and nodes Q3 and Q1 are still connected to node Q5-5, respectively.

At Step 406, the updated current connected subgraph is printed (if there are currently to-be-printed connected subgraphs, the updated current connected subgraph can be placed in the print stack first and then wait for printing). Next connected subgraph in the print stack (e.g., the hierarchical subgraph 51) is taken as the current connected subgraph, and the process returns to Step 403. Or the process comes to the end if the subgraph queue is empty.

The above Steps 403 to 406 can be repeated until all connected subgraphs in the print stack can be printed on one page.

When the process returns to Step 403, whether a hierarchical subgraph can be printed on one page at a ratio of 1:1 is further determined. For a hierarchical subgraph that cannot be printed on one page at a ratio of 1:1, the hierarchical subgraph is further split into finer hierarchical subgraphs according to Step 404. The thumbnails are generated. The finer hierarchical subgraphs that are split are also placed in the print stack, waiting to determine whether they can be printed on one page at a ratio of 1:1. Similar operations can be performed in other similar cases. Then, a large graph is printed hierarchically from overview to details. The recursive printing order can guarantee the hierarchical progressive relationship of the relational graph, which makes it easier for readers to read the entire relational graph.

For example, the five hierarchical subgraphs 51-55 shown in FIG. 5 can sequentially undergo Step 403. Assuming that the above five hierarchical subgraphs (e.g., the hierarchical subgraph 51, the hierarchical subgraph 52, the hierarchical subgraph 53, the hierarchical subgraph 54 and the hierarchical subgraph 55) can be printed on one page, and the printout effects are shown in FIG. 6-FIG. 10. Assuming that the hierarchical subgraph 55 cannot be printed on one page, the hierarchical subgraph 55 can be split into one or more hierarchical subgraphs according to Step 404. Thumbnails of these hierarchical subgraphs are generated and the hierarchical subgraph 55 is updated according to Step 405. Then, whether the split hierarchical subgraphs can be printed on one page is determined one by one, and the split hierarchical subgraphs are placed in the print stack or re-clustered or split accordingly. Similar operations can be performed round by round.

In some embodiments, the whole relational graph is first split into a hierarchy to ensure that each hierarchical subgraph can be printed on one page at a ratio of 1:1. Then, the subgraphs are printed in a predetermined order, or the user decides to print which graphs and in which order the graphs are printed. For example, at Step 406, instead of printing, the updated current connected subgraph is first placed in the print queue or identified as a to-be-printed file.

In some embodiments, an apparatus for generating a view of a relational graph includes a processor and a memory. The memory is configured to store a program for printing a relational graph. The program can include a set of instructions. When read and executed by the processor, the instructions can cause the apparatus to perform the following operations: if an overall view of a to-be-printed relational graph exceeds a set print size, clustering nodes in the to-be-printed relational graph according to attribute information of the nodes, so that an overall view of the relational graph after the clustering is within the range of the print size; and separately printing the overall view of the relational graph after the clustering and subviews formed by the clustered nodes.

In some embodiments, when read and executed by the processor, the instructions can cause the apparatus to, after clustering the nodes in the to-be-printed relational graph, in the overall view of the to-be-printed relational graph, respectively scale down regions corresponding to respective clusters of nodes obtained by the clustering, thus obtaining the overall view of the relational graph after the clustering. Alternatively, when read and executed by the processor, the instructions can cause the apparatus to, after clustering the nodes in the to-be-printed relational graph, in the overall view of the to-be-printed relational graph, display each cluster of nodes obtained by the clustering as a node, thus obtaining the overall view of the relational graph after the clustering.

In some embodiments, printing subviews formed by the clustered nodes can include, for each cluster of nodes obtained by clustering, if a subview formed by the cluster of nodes is within the range of the print size, printing the subview formed by this cluster of nodes. Printing subviews formed by the clustered nodes can also include, for each cluster of nodes obtained by clustering, if the subview formed by this cluster of nodes exceeds the print size, re-clustering this cluster of nodes according to attribute information of this cluster of nodes to obtain clusters of next-level nodes, so that a subview formed by this cluster of nodes after the re-clustering is within the range of the print size. The subview formed by this cluster of nodes after the re-clustering can be printed.

In some embodiments, the clusters of nodes obtained by clustering or re-clustering include one or more of the following: clusters of nodes obtained by clustering nodes in the to-be-printed relational graph and clusters of next-level nodes obtained by re-clustering a cluster of nodes.

In some embodiments, when read and executed by the processor, the instructions can cause the apparatus to, after re-clustering a cluster of nodes, in the subview formed by this cluster of nodes, respectively scale down regions corresponding to respective clusters of next-level nodes obtained by the re-clustering, thus obtaining a subview formed by this cluster of nodes after the re-clustering. Alternatively, when read and executed by the processor, the instructions can cause the apparatus to, after re-clustering a cluster of nodes, in the subview formed by this cluster of nodes, display each cluster of next-level nodes obtained by the re-clustering as a node, thus obtaining the subview of this cluster of nodes after the re-clustering.

In some embodiments, the subviews formed by the clustered nodes can include respective subviews formed by respective clusters of nodes obtained by clustering. For example, the subview formed by a cluster of nodes is a maximal connected subgraph including this cluster of nodes.

In some embodiments, when read and executed by the processor, the instructions can cause the apparatus to perform operations corresponding to the Steps S110 to S120 of FIG. 3. For other implementation details, reference can be made to FIG. 3 and related texts.

Figure 11:
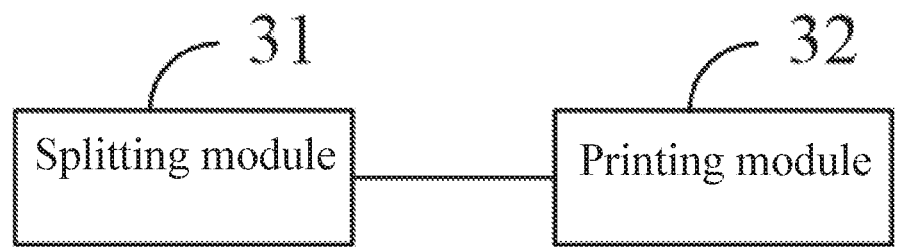
FIG. 11 is a schematic diagram of an apparatus for generating a relational graph according to some embodiments of the present disclosure.

In some embodiments, an apparatus for printing a relational graph, as shown in FIG. 11, includes a splitting module 31 and a printing module 32. The splitting module 31 can be configured to, if an overall view of a to-be-printed relational graph exceeds a set print size, cluster nodes in the to-be-printed relational graph according to attribute information of the nodes, so that an overall view of the relational graph after the clustering is within the range of the print size. The printing module 32 can be configured to separately print the overall view of the relational graph after the clustering and subviews formed by the clustered nodes.

In some embodiments, the splitting module 31 can further be configured to, after clustering the nodes in the to-be-printed relational graph, in the overall view of the to-be-printed relational graph, respectively scale down regions corresponding to respective clusters of nodes obtained by the clustering, thus obtaining the overall view of the relational graph after the clustering. Alternatively, the splitting module 31 can further be configured to, after clustering the nodes in the to-be-printed relational graph, in the overall view of the to-be-printed relational graph, display each cluster of nodes obtained by the clustering as a node, thus obtaining the overall view of the relational graph after the clustering.

In some embodiments, for each cluster of nodes obtained by clustering, the printing module 32 can be further configured to print a subview formed by this cluster of nodes if the subview formed by the cluster of nodes is within the range of the print size. For each cluster of nodes obtained by clustering, the splitting module 31 can be further configured to re-cluster this cluster of nodes according to attribute information of this cluster of nodes to obtain clusters of next-level nodes if the subview formed by this cluster of nodes exceeds the print size, so that a subview formed by this cluster of nodes after the re-clustering is within the range of the print size. The printing module 32 can be further configured to print the subview formed by this cluster of nodes after the re-clustering.

In some embodiments, the clusters of nodes obtained by clustering or re-clustering can include one or more of the following: clusters of nodes obtained by clustering nodes in the to-be-printed relational graph and clusters of next-level nodes obtained by re-clustering a cluster of nodes.

In some embodiments, the printing module 32 can be further configured to, after re-clustering a cluster of nodes, in the subview formed by this cluster of nodes, respectively scale down regions corresponding to respective clusters of next-level nodes obtained by the re-clustering, thus obtaining a subview formed by this cluster of nodes after the re-clustering. Alternatively, the printing module 32 can be further configured to, after re-clustering a cluster of nodes, in the subview formed by this cluster of nodes, display each cluster of next-level nodes obtained by the re-clustering as a node, thus obtaining the subview of this cluster of nodes after the re-clustering.

In some embodiments, the subviews formed by the clustered nodes can include respective subviews formed by respective clusters of nodes obtained by clustering. For example, the subview formed by a cluster of nodes is a maximal connected subgraph including this cluster of nodes.

In some embodiments, the operations performed by the splitting module 31 and the printing module 32 can respectively correspond to the Steps S110 to S120 of FIG. 3. For other implementation details, reference can be made to FIG. 3 and related texts.

Those of ordinary skill in the art should understand that all or part of steps of the above-mentioned methods can be completed by relevant hardware under instructions through programs, and the programs or instructionscan be stored in a computer readable storage medium, such as a read-only memory, a magnetic disk or CD, etc. Optionally, all or part of the steps of the embodiments described above can also be implemented using one or more integrated circuits. Accordingly, various modules/units in the above embodiments can be implemented in the form of hardware or can be implemented in the form of software functional modules. This disclosure is not limited to any particular form of combinations of hardware and software.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

Moreover, the terms "include," "comprise" or other variations thereof are intended to cover non-exclusive inclusion, so that a process, method, article or terminal device including a series of elements not only includes the elements, but also includes other elements not clearly listed, or further includes elements inherent to the process, method, article or terminal device. In the absence of more limitations, an element defined by "including a/an . . . " does not exclude that the process, method, article or terminal device including the element further has other identical elements.

Certainly, there can be various other embodiments of this disclosure, and those skilled in the art would be able to make various changes and variations in accordance with this disclosure without departing from the spirit and substance of this disclosure, and all these corresponding changes and variations should fall within the scope of the claims of this disclosure.

What is claimed is:

1. A method for printing a relational graph, comprising:
   determining whether an overall view of a to-be-printed relational graph exceeds a set print size;
   in response to the overall view of the to-be-printed relational graph exceeding the set print size, clustering nodes in the to-be-printed relational graph according to the set print size and attribute information of the nodes to form a clustered overall view of the relational graph and subviews of the relational graph; and
   printing the clustered overall view of the relational graph after clustering the nodes and the subviews formed based on the clustered nodes.

2. The method according to claim 1, further comprising:
   in the overall view of the to-be-printed relational graph, scaling down regions corresponding to respective clusters of nodes obtained by clustering the nodes to obtain the clustered overall view of the relational graph; or
   in the overall view of the to-be-printed relational graph, displaying each cluster of nodes, obtained by clustering the nodes, as a node to obtain the clustered overall view of the relational graph.

3. The method according to claim 1, wherein printing the subviews formed by the clustered nodes comprises, for each cluster of nodes obtained by clustering:
   in response to a subview formed by the cluster of nodes is within the range of the set print size, printing the subview formed by the cluster of nodes; and
   in response to the subview formed by the cluster of nodes exceeds the set print size,
      re-clustering the cluster of nodes according to attribute information of the cluster of nodes to obtain clusters of next-level nodes, so that a subview formed by the cluster of nodes after the re-clustering is within the range of the set print size; and
      printing the subview formed by the cluster of nodes after the re-clustering.

4. The method according to claim 3, further comprising:
   in the subview formed by the cluster of nodes, scaling down regions corresponding to clusters of next-level nodes obtained by the re-clustering to obtain a subview formed by the cluster of nodes after the re-clustering; or
   in the subview formed by the cluster of nodes, displaying each cluster of next-level nodes obtained by the re-clustering as a node to obtain a subview of the cluster of nodes after the re-clustering.

5. The method according to claim 3, further comprising:
   printing subviews formed by the cluster of next-level nodes after the re-clustering.

6. The method according to claim 5, further comprising:
   in response to the subview formed by the cluster of next-level nodes exceeds the set print size, re-clustering the cluster of next-level nodes according to attribute information of the cluster of next-level nodes to obtain clusters of further next-level nodes, so that a re-clustered subview formed by the cluster of next-level nodes after the re-clustering is within the range of the set print size.

7. The method according to claim 1, wherein the subviews formed by the clustered nodes comprise:
   subviews formed by clusters of nodes obtained by clustering, wherein a subview formed by a cluster of nodes is a maximal connected subgraph comprising this cluster of nodes.

8. An apparatus for printing a relational graph, comprising:
   a memory storing a set of instructions; and
   at least one processor configured to execute the set of instructions to cause the apparatus to perform:
      determining whether an overall view of a to-be-printed relational graph exceeds a set print size;
      in response to the overall view of the to-be-printed relational graph exceeding the set print size, clustering nodes in the to-be-printed relational graph according to the set print size and attribute information of the nodes to form a clustered overall view of the relational graph and subviews of the relational graph; and
      printing the clustered overall view of the relational graph after clustering the nodes and the subviews formed based on the clustered nodes.

9. The apparatus according to claim 8, wherein the at least one processor is further configured to execute the set of instructions to cause the apparatus to perform:

in the overall view of the to-be-printed relational graph, scaling down regions corresponding to respective clusters of nodes obtained by clustering the nodes to obtain the clustered overall view of the relational graph; or in the overall view of the to-be-printed relational graph, displaying each cluster of nodes, obtained by clustering the nodes, as a node to obtain the clustered overall view of the relational graph.

10. The apparatus according to claim 8, wherein the at least one processor is further configured to execute the set of instructions to cause the apparatus to perform:

for each cluster of nodes obtained by clustering, in response to a subview formed by the cluster of nodes is within the range of the set print size, printing the subview formed by the cluster of nodes; and in response to the subview formed by the cluster of nodes exceeds the set print size,
re-clustering the cluster of nodes according to attribute information of the cluster of nodes to obtain clusters of next-level nodes, so that a subview formed by the cluster of nodes after the re-clustering is within the range of the set print size; and
printing the subview formed by the cluster of nodes after the re-clustering.

11. The apparatus according to claim 10, wherein the at least one processor is further configured to execute the set of instructions to cause the apparatus to perform:

in the subview formed by the cluster of nodes, scaling down regions corresponding to clusters of next-level nodes obtained by the re-clustering to obtain a subview formed by the cluster of nodes after the re-clustering; or in the subview formed by the cluster of nodes, displaying each cluster of next-level nodes obtained by the re-clustering as a node to obtain a subview of the cluster of nodes after the re-clustering.

12. The apparatus according to claim 10, wherein the at least one processor is further configured to execute the set of instructions to cause the apparatus to perform:

printing subviews formed by the cluster of next-level nodes after the re-clustering.

13. The apparatus according to claim 8, wherein the subviews formed by the clustered nodes comprise:

subviews formed by clusters of nodes obtained by clustering, wherein a subview formed by a cluster of nodes is a maximal connected subgraph comprising this cluster of nodes.

14. A non-transitory computer readable storage medium storing a set of instructions that are executable by one or more processing devices to cause a computer to perform a method for printing a relational graph, the method comprising:

determining whether an overall view of a to-be-printed relational graph exceeds a set print size;

in response to the overall view of a to-be-printed relational graph exceeding the set print size, clustering nodes in the to-be-printed relational graph according to the set print size and attribute information of the nodes to form a clustered overall view of the relational graph and subviews of the relational graph; and printing the clustered overall view of the relational graph after the clustering the nodes and the subviews formed based on the clustered nodes.

15. The non-transitory computer readable storage medium according to claim 14, wherein the method further comprises:

in the overall view of the to-be-printed relational graph, scaling down regions corresponding to respective clusters of nodes obtained by clustering the nodes to obtain the clustered overall view of the relational graph; or in the overall view of the to-be-printed relational graph, displaying each cluster of nodes, obtained by clustering the nodes, as a node to obtain the clustered overall view of the relational graph.

16. The non-transitory computer readable storage medium according to claim 14, wherein printing the subviews formed by the clustered nodes comprises, for each cluster of nodes obtained by clustering:

in response to a subview formed by the cluster of nodes is within the range of the set print size, printing the subview formed by the cluster of nodes; and in response to the subview formed by the cluster of nodes exceeds the set print size,
re-clustering the cluster of nodes according to attribute information of the cluster of nodes to obtain clusters of next-level nodes, so that a subview formed by the cluster of nodes after the re-clustering is within the range of the set print size; and
printing the subview formed by the cluster of nodes after the re-clustering.

17. The non-transitory computer readable storage medium according to claim 16, wherein the method further comprises:

in the subview formed by the cluster of nodes, scaling down regions corresponding to clusters of next-level nodes obtained by the re-clustering to obtain a subview formed by the cluster of nodes after the re-clustering; or in the subview formed by the cluster of nodes, displaying each cluster of next-level nodes obtained by the re-clustering as a node to obtain a subview of the cluster of nodes after the re-clustering.

18. The non-transitory computer readable storage medium according to claim 16, wherein the method further comprises:

printing subviews formed by the cluster of next-level nodes after the re-clustering.

19. The non-transitory computer readable storage medium according to claim 18, wherein the method further comprises:

in response to the subview formed by the cluster of next-level nodes exceeding the set print size, re-clustering the cluster of next-level nodes according to attribute information of the cluster of next-level nodes to obtain clusters of further next-level nodes, so that a re-clustered subview formed by the cluster of next-level nodes after the re-clustering is within the range of the set print size.

20. The non-transitory computer readable storage medium according to claim 14, wherein the subviews formed by the clustered nodes comprise:

subviews formed by clusters of nodes obtained by clustering, wherein a subview formed by a cluster of nodes is a maximal connected subgraph comprising this cluster of nodes.

* * * * *